Figure 1:
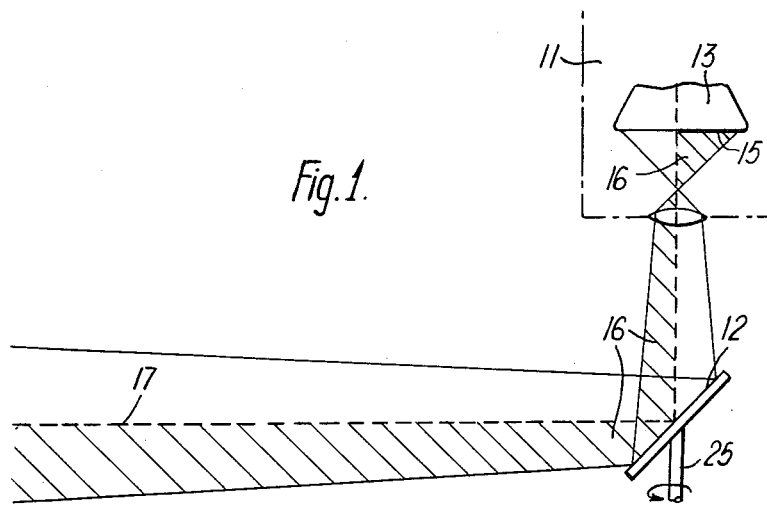

June 19, 1962 G. M. HELLINGS 3,040,123
TELEVISION EQUIPMENT, ESPECIALLY FOR GROUND
AIRCRAFT TRAINERS AND THE LIKE
Filed Oct. 7, 1959 3 Sheets-Sheet 1

GEOFFREY M. HELLINGS
Inventor

By Richard D. Stephens
Attorney

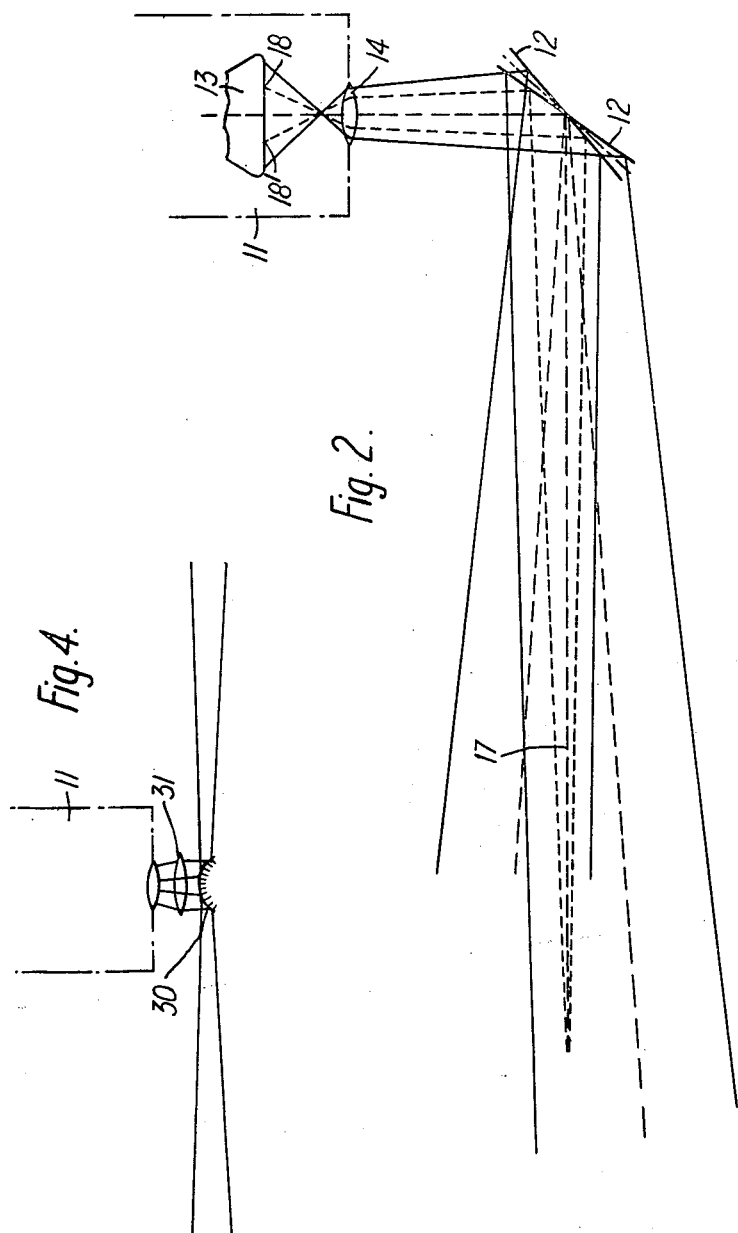

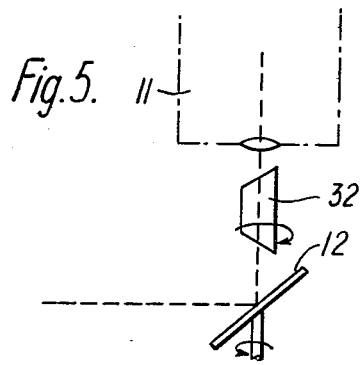
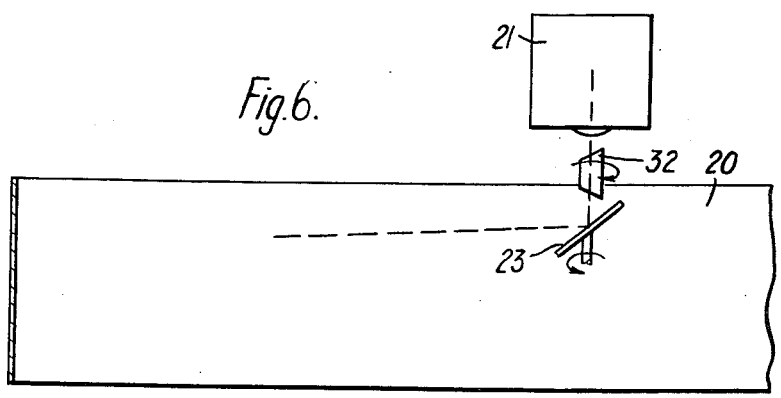
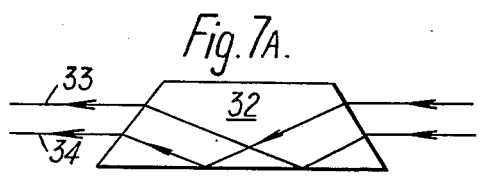
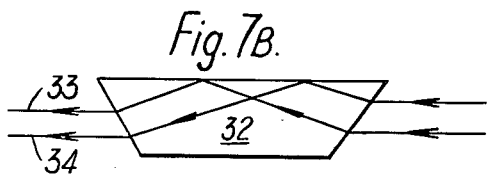
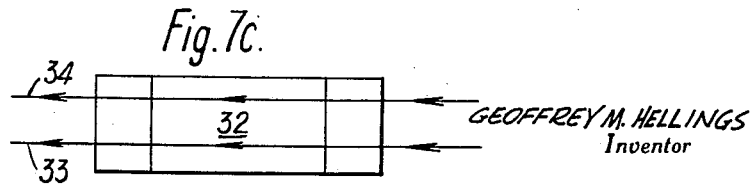

United States Patent Office 3,040,123
Patented June 19, 1962

3,040,123
TELEVISION EQUIPMENT, ESPECIALLY FOR GROUND AIRCRAFT TRAINERS AND THE LIKE
Geoffrey Moffat Hellings, Cuddington, Aylesbury, England, assignor to General Precision, Inc., a corporation of Delaware
Filed Oct. 7, 1959, Ser. No. 844,944
8 Claims. (Cl. 178—6)

This invention relates to television apparatus comprising a television camera for viewing a scene and projection apparatus controlled by the camera (either via a radio transmission or through a direct cable in the so-called "closed circuit" system) for throwing an image of the scene on to a viewing screen and giving a subject substantially the same view of the scene as is obtained by the camera.

Conventional equipment of this kind gives a field of view restricted to a maximum angle of the order of 50° at the camera. However, for many purposes it would be very advantageous for the view to be much more extensive laterally, for example if the subject could be at the centre of a cylindrically curved screen and see a panoramic view extending through 180° or even more in azimuth.

This would greatly enhance the entertainment of a viewing subject or group of subjects, but it is especially desirable in training devices where the subject is placed in a replica of the pilot's or driver's compartment of an aircraft or other vehicle provided with the appropriate controls, and the camera is automatically moved in relation to a scale model of terrain or sea in accordance with his supposed handling of the vehicle.

In such training devices the subject regulates his handling of the controls in response to the behaviour of the external scene. In actual travel or flight the peripheral or "corner of the eye" impressions are important in judging such matters as speed of travel and the fine adjustments of height above a runway during the landing of an aircraft. Also there are occasions when the trainee may wish to look sideways or aft rather than ahead, for example in the case of a supposed road vehicle, at a crossroads or when reversing, or in the case of a supposed aircraft, when circling an airfield prior to landing.

It is an object of the invention to provide apparatus which will give such a panoramic view.

A further object of the invention is to provide television equipment comprising a television camera to view a scene, in combination with projection-receiver apparatus for throwing an image of that scene on to a screen before an observer, and wherein the camera and its optical system are arranged so that the overall picture mosaic of the scene built up in the camera during frame scanning operations represents a wider angle of view of the scene than can ordinarily be projected for observation on a screen by a single stationary projection beam, and the projection beam of the projection-receiver apparatus is caused to sweep over the screen repeatedly in a manner and at a rate determined in accordance with the mode and rate of viewing and frame scanning at the camera so as to display the wide angle view correctly on the screen.

According to a further object, means are provided for causing the viewing and projection beams of the camera and projector to sweep transversely, across the scene and the viewing screen respectively, steadily and in synchronism during each frame of the scanning operation. Thus the scene covered during a frame period will be wider in azimuth than would otherwise be the case; nevertheless the synchronism between the sweep motions of the optical axes will ensure that at each instant the picture element being dealt with by the camera will be projected at the correct position on the viewing screen.

It is possible to arrange for the camera and projector both to look horizontally and be rotated in synchronism about vertical axes. A more convenient arrangement is, however, for them to look downward or upward at mirrors set at angles of the order of 45°, and to rotate the mirrors about vertical axes instead. The following description is of various embodiments of the invention, given by way of example, including embodiments in which this latter arrangement is adopted.

Figure 3:
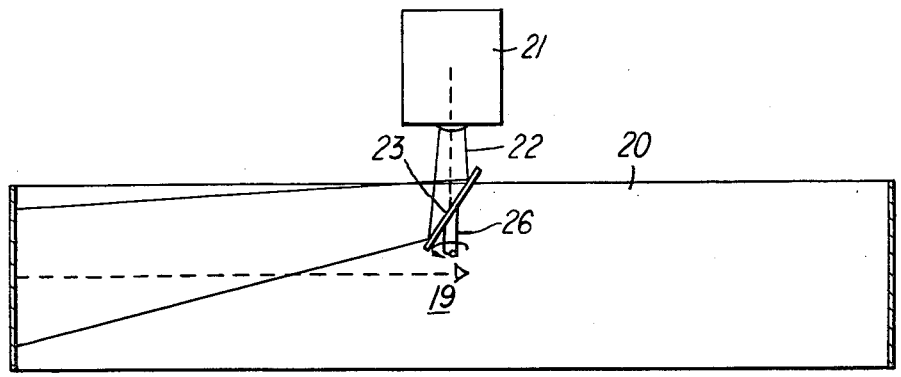

Reference will be had to the accompanying diagrammatic drawings, in which:

FIGURES 1 and 2 are diagrams illustrating the television camera arrangement according to one embodiment of the invention, FIGURE 3 is a diagram illustrating an arrangement of projection apparatus suitable for use with the camera arrangement of FIGURES 1 and 2, FIGURE 4 is a diagram illustrating the camera arrangement of another embodiment, FIGURES 5 and 6 illustrate the camera and projector arrangements respectively of a further embodiment, and FIGURES 7A to 7C are diagrams used in explanation of the operation of the embodiment of FIGURES 5 and 6.

Referring firstly to FIGURES 1 to 3, these illustrate an arrangement as aforesaid in which the camera and projector have their axes vertical and look down on rotating 45° mirrors. In this arrangement, the camera tube is controlled to have radial scan, that is to say, each scan line runs between the centre and the periphery of the photomosaic, so that a complete frame consists of a succession of closely-spaced radial spokes and is completed in the usual frame period of $\frac{1}{25}$ second. Electronic circuit arrangements for producing this type of scan are well known in the art and need no description here.

The 45° mirror associated with the camera is driven to rotate about the vertical optical axis of the latter (which axis it therefore reflects to sweep the scene in azimuth) at the same speed of 25 revolutions per second, and it is in phase with the line scanning in the sense that at every instant the horizontal reflected extension of the optical axis lies in the same vertical plane as the active scan line on the tube face. In these circumstances, the successive radial scan lines will be associated with successive vertical elemental strips of the scene, the process continuing through the whole 360° in azimuth.

The image traced on the tube is an annular one. The mirror will not usually be set at exactly 45° to the optical axis, since in that event the system would deal only with the upper or lower half of the scene, according to whether the radial scan line active at any instant were the one in front or the one behind the vertical tube axis, i.e. the one nearest or the one farthest from the scene viewed.

To illustrate this, in FIGURE 1 of the accompanying drawings there is shown diagrammatically a radial scan television camera 11 arranged vertically, and with its optical axis reflected into the horizontal by a mirror 12 that rotates on a shaft 25 in synchronism with the active scan line of the camera.

The camera is of the type in which the image on the tube 13 is inverted by the camera lens 14. It will be seen that, since at any instant the active scan line extends only halfway across the tube, the only part of the optical image on the tube that will be transduced by the camera will be that produced by one half of the portion of the viewing beam that lies in the plane of the paper. Thus, if the active scan line is the rear radius line 15, the hatched part 16 of the viewing beam is that which produces the image transduced and only the lower half of the scene viewed is dealt with, the horizon (on the line of the optical axis 17) being in each case concentrated at the centre of the tube.

If now the mirror is tilted to an angle more or less than 45°, the effective portion of the viewing beam is raised or lowered, as illustrated in FIGURE 2. The horizon elements of the scene are now no longer thrown on to the centre of the camera tube but appear at a position 18 or 18′ between the tube centre and the tube periphery. Hence, as the mirror rotates and causes the viewing beam to sweep horizontally, the horizon forms a ring about the tube centre.

If the rear radial scan line is used, then the mirror is tilted to increase its angle to the vertical and the horizon appears at 18. Assuming that an outdoor scene is being viewed, this will cause the earth to appear around the tube outside the horizon ring with the bottom or foreground of the earth scene having the maximum spread at the tube periphery. If, on the other hand the front scan line is used and the angle of the mirror to the vertical is decreased, the converse will apply; the sky will appear outside the horizon ring, and the earth inside the ring with the foreground crowded towards the tube centre.

Since the spread of the radial scanning lines may cause some variation from top to bottom of the scene in definition and in visibility of line structure, the choice between these alternatives may depend on circumstances. The former arrangement may prove more useful in many cases. Preferably the mirror is adjusted away from the 45° position to an extent sufficient to bring the horizon ring to a position about two thirds of the radius out from the centre of the tube.

The projector arrangements will correspond with the foregoing, with mirror and radial scan lines rotating in synchronism with those of the camera, so that each picture element will be projected at the correct position on a cylindrical screen having the projector at its centre above the viewer's head. The rotating mirror of this assembly may be set at a slightly reduced angle to its vertical axis of rotation so as to bring the projected picture down to the viewer's level.

Such an arrangement is illustrated in FIGURE 3, wherein a subject at 19 views the panoramic scene projected on to a continuous cylindrical screen 20 surrounding him. The projector 21 is disposed vertically above the subject's head and its projection beam 22 is reflected by a mirror 23 rotating on a shaft 26 in synchronism with the mirror 12 of the arrangement of FIGURE 1.

While the projected scene has to appear on the screen before the observer undistorted, it does not matter if the photo-mosaic on the camera tube represents a distorted picture so long as the distortion is eliminated during projection. Accordingly an arrangement is possible in which the viewing beam of the camera does not move but instead the camera optical system is arranged to focus the whole panorama of the scene viewed into the camera all the time.

FIGURE 4 illustrates one such arrangement. The camera 11 is disposed with its axis vertical as before, and rays approaching this axis horizontally from all directions are all brought into the camera by a spherical mirror 30 and lens 31. In this way a complete annular view of the scene is presented at the camera tube continuously.

It will be appreciated that, in the arrangements described, an inter-lacing radial scan can be used if desired, that is to say one in which odd and even "spokes" are traced in alternate frames.

Other arrangements in accordance with the invention are possible. For example, the camera and projector tubes can have the conventional rectangular raster with parallel line scan, and their optical axes sweeping round at such a speed as to move, during each complete frame period, through an angle equal to the transverse angular field of view of the camera. Corresponding scan lines in successive frames would thus be contiguous, and each frame would deal with a rhomboidal portion of the scene. Consideration will show, however, that in such an arrangement the rotating mirror will cyclically vary the orientation of the scene falling on the camera tube, so that it may be essential or desirable to add optical elements, such as rotating roof prism devices driven at half the rotational speed of the mirrors, to neutralise this effect. The radial scan arrangement described earlier avoids this difficulty, since the orientation of the scan lines changes inherently in synchronism.

FIGURES 5 and 6 illustrate respectively a camera and a projector arrangement when the raster is rectangular with parallel line scanning. It will be seen that roof prisms 32 are inserted in the optical systems between the camera 11 and its rotating mirror 12, and the projector 21 and its rotating mirror 23, respectively. These prisms are each rotated about the optical axis of the camera or projector, as the case may be, in synchronism with the mirrors but at half the mirror speed.

In FIGURES 7A to 7C, a roof prism 32 is shown in three positions, i.e. upright, inverted and on its side. It will be seen that two vertically-spaced rays 33, 34 are mutually transposed on passing through the prism when the prism is in the upright position of FIGURE 7A, and they are also transposed when the prism has been rotated through 180° into the inverted position of FIGURE 7B. Between these positions 180° apart, there is the 90° position of FIGURE 7C where the prism is on its side and in which the rays pass through undeflected. From this it will be understood that rotation of the prism effects rotation of a beam of rays passing through it, and that the beam is rotated twice for a full 360° of rotation of the prism. Accordingly, since the rotation of the mirrors 12 and 23 produces rotation respectively of the picture in the camera tube, and the picture projected by the projector, at the same rate, rotation of the prisms 32 at half this speed and in the appropriate directions cancels out that picture rotation.

It will be appreciated that arrangements according to the invention will operate satisfactorily whether the camera is stationary or whether it is moving linearly and/or angularly with respect to the scene, and the invention is therefore particularly (though not exclusively) applicable to training or entertainment devices in which the camera moves with respect to a scale model terrain in simulation of the manoeuvres of an aircraft or land vehicle.

It will also be understood that, for an acceptable standard of definition in the projected picture, the electrical bandwidth of the system must be several times that of conventional systems, since in covering 360° instead of 50° (for example) it has to deal with approximately seven times the number of picture elements in the same period, commonly 1/25 second. The provision of such bandwidths, where required, offers no undue difficulty to those skilled in the art, especially in "closed-circuit" systems.

Although the invention has been described with reference to certain specific embodiments thereof, numerous further arrangements are possible without departing from the spirit and scope of the invention. The foregoing descriptions, taken in conjunction with the drawings, are merely illustrative and not to be construed in a limiting sense.

I claim:

1. Television equipment comprising a televivsion camera to view a scene, in combination with projection-receiver apparatus for throwing an image of that scene on to a screen before an observer, wherein the camera and its optical system are arranged so that the overall picture mosaic of the scene built up in the camera during frame scanning operations represents a wider angle of view of the scene than can ordinarily be projected for observation on a screen by a single stationary projection beam, wherein the screen is of substantially cylindrical or part cylindrical form extending all or a large part of the way around the position of the observer, wherein the projection beam is arranged to rotate so as to sweep around the screen in synchronism with the camera scanning rate, wherein the projection beam is turned toward the screen by reflecting means which is set approximately at 45° to and is rotated about the projector axis, wherein both the camera viewing beam and the projection beam sweep transversely across the scene and the viewing screen respectively, in synchronism with one another during each frame of the scanning operation, wherein the camera viewing beam is reflected by reflecting means which is set at approximately 45° to and is rotated about the camera axis, and wherein the mode of scanning is radial and the reflecting means associated with the projector is rotated continuously in phase with the active scan line.

2. Equipment as claimed in claim 1, wherein the mirror reflecting the camera viewing beam is adjusted out of the 45° setting to cause the viewed horizon to appear as a ring around the camera tube centre.

3. Equipment as claimed in claim 2, wherein the mirror is adjusted to the extent necessary to bring the horizon ring to a position about two thirds of the radius out from the centre of the camera tube.

4. Equipment as claimed in claim 3, wherein the observer is stationed at the axis of the rotating cylindrical screen, the projector and its mirror are disposed above the head of the observer, and the mirror makes an angle of somewhat less than 45° to its axis of rotation so as to bring the projected picture down substantially to the observer's level.

5. Television equipment comprising a television camera employing a radial mode of line scanning in transducing into an electrical transmission signal a photomosaic of a scene it views by means of a mirror disposed on and rotating about its optical axis, a picture screen extending in substantially hollow cylindrical form around a central axis, a television projector receiving the transmission signal from the camera and likewise employing a radial mode of scanning in rebuilding a picture of the scene viewed by the camera into optical form for projection in an optical beam, said projector being disposed with its optical axis coincident with the central axis of the screen, and a rotating mirror disposed on the projector optical axis in the path of the projection beam, said mirror being rotated about said axis in synchronism with the radial line scan and being set at substantially 45° to said axis to reflect the beam on to the surface of the cylindrical screen whereby the beam sweeps round the screen as the mirror rotates.

6. Television equipment comprising a television camera employing a radial mode of line scanning in transducing into an electrical transmission signal a photomosaic of a scene it views and being disposed with its optical axis substantially at right angles to the general directional plane in which the scene is viewed, a rotating mirror disposed on the camera optical axis and set at substantially 45° to said axis to reflect into the camera viewing rays approaching the mirror in said general plane said mirror being rotated about said axis in synchronism with the radial line scan, a picture screen extending in substantially hollow cylindrical form around a central axis, a television projector receiving the transmission signal from the camera and likewise employing a radial mode of scanning in rebuilding a picture of the scene viewed by the camera into optical form for projection in an optical beam, said projector being disposed with its optical axis coincident with the central axis of the screen, and a rotating mirror disposed on the projector optical axis in the path of the projection beam, said mirror being rotated about said axis in synchronism with the radial line scan and being set at substantially 45° to said axis to reflect the beam on to the surface of the cylindrical screen whereby the beam sweeps round the screen as the mirror rotates.

7. In a ground aircraft trainer, closed circuit television equipment comprising a television camera employing a radial mode of line scanning in transducing into an electrical transmission signal a photomosaic of a model terrain scene that it views, said camera being movable in accordance with the movements of a simulated aircraft and being disposed with its optical axis extending generally vertically, a rotating optical reflector disposed on the optical axis of the camera and reflecting into the camera rays approaching the reflector from the model scene in a generally horizontal plane said reflector being rotated about said axis in synchronism with the radial line scan whereby the complete camera photomosaic represents the model scene viewed through substantially 360° in azimuth, a picture screen extending in hollow cylindrical form around a vertical central axis at which a trainee is positioned to observe the screen, a television projector receiving the transmission signal from the camera and employing a radial mode of scanning in rebuilding a picture of the model scene viewed by the camera into optical form for projection in an optical beam, said projector being disposed above the trainee's station with its optical axis coincident with the central axis of the screen, and a further rotating optical reflector disposed on the optical axis of the projector to reflect the projected beam on to the inner surface of the cylindrical screen said reflector being rotated about said screen central axis in synchronism with the radial line scanning whereby the 360° view of the model scene displayed on the screen is correctly spread out around the trainee through 360° viewing angle on the screen.

8. Television equipment comprising a television camera employing a rectangular raster with parallel line scanning in transducing into an electrical transmission signal a photomosaic of a scene it views and being disposed with its optical axis substantially at right angles to the general directional plane in which the scene is viewed, a first rotating mirror disposed on the camera optical axis and set at substantially 45° to said axis to reflect into the camera rays approaching the mirror in said general plane said mirror being rotated about said axis during the period of scanning of one complete frame by an angular amount equal to the angle of view of the camera in the direction in which the mirror rotates, a roof prism also disposed on the camera optical axis and rotated at half the speed of the mirror to cancel out the picture rotation produced by the said first mirror, a picture screen extending in substantially hollow cylindrical form around a central axis, a television projector receiving the transmission signal from the camera and likewise employing a rectangular raster with parallel line scanning in rebuilding a picture of the scene viewed by the camera into optical form for projection in an optical beam, said projector being disposed with its optical axis coincident with the central axis of the screen, a second rotating mirror disposed on the projector axis in the path of the projection beam said mirror being rotated about said axis in synchronism with the first mirror and being set at substantially 45° to said screen axis to reflect the beam on to the inner surface of the cylindrical screen whereby the beam sweeps round the screen as the mirror rotates, and a further roof prism disposed on the projector optical axis and rotated at half the mirror speed to cancel out the picture rotation produced by said second mirror.

References Cited in the file of this patent

UNITED STATES PATENTS

| | | |
|---|---|---|
| 1,660,886 | Randall | Feb. 28, 1928 |
| 1,985,684 | Nicolson | Dec. 25, 1934 |
| 2,304,434 | Ayres | Dec. 8, 1942 |
| 2,632,801 | Donaldson | Mar. 24, 1953 |
| 2,905,758 | Walker | Sept. 22, 1959 |
| 2,966,096 | D'Incerti | Dec. 27, 1960 |